(12) United States Patent
Cheng

(10) Patent No.: US 8,808,095 B2
(45) Date of Patent: Aug. 19, 2014

(54) TORQUE CONNECTOR ASSEMBLY

(71) Applicant: Chin-Shun Cheng, Taichung (TW)

(72) Inventor: Chin-Shun Cheng, Taichung (TW)

( * ) Notice: Subject to any disclaimer, the term of this patent is extended or adjusted under 35 U.S.C. 154(b) by 42 days.

(21) Appl. No.: 13/653,427

(22) Filed: Oct. 17, 2012

(65) Prior Publication Data

US 2014/0106889 A1 Apr. 17, 2014

(51) Int. Cl.
*F16D 7/02* (2006.01)

(52) U.S. Cl.
USPC ............................................. 464/23; 464/39

(58) Field of Classification Search
USPC .................. 464/23, 36, 38, 39, 43, 44, 46–48
See application file for complete search history.

(56) References Cited

U.S. PATENT DOCUMENTS 3,942,337 A * 3/1976 Leonard et al. ................. 464/36
8,141,463 B2 * 3/2012 Lai

* cited by examiner

*Primary Examiner* — Gregory Binda
*Assistant Examiner* — Josh Skroupa

(57) ABSTRACT

A torque connector assembly includes an outer tube having a first threaded portion, a first hole and multiple windows. Each window has first and second scales formed on its two sides. An inner tube has a second threaded portion, a second hole and an index line. The first and second threaded portions are threadedly connected to each other. The index line is located corresponding to the windows. A first connector has a first engaging end and a second engaging end. A second connector has a first matching portion and a second mounting portion which is mounted to the second engaging end. A third connector has a second matching portion which is connected with the first matching portion. The third connector has a third mounting portion which extends from the second hole. The resilient member is biased between the second connector and the outer tube.

6 Claims, 11 Drawing Sheets

TORQUE CONNECTOR ASSEMBLY

FIELD OF THE INVENTION

The present invention relates to a torque connector assembly, and more particularly, to a torque connector assembly for easily observing the torque before and after work.

BACKGROUND OF THE INVENTION

The conventional torque connector assembly is disclosed in U.S. Pat. No. 3,942,337 and generally comprises an outer tube, an inner tube, a first connector, a second connector, a positioning member and a resilient member. The inner tube is threadedly connected to the outer tube, and each of the inner and outer tubes has scales and an index line. The first and second connectors are connected to each other by the two respective first ends thereof and the two respective first ends are located in the space between the inner and outer tubes, and the two respective second ends of the first and second connectors protrude from the inner and outer tubes respectively so as to be connected with the socket and the wrench. The positioning member is composed of multiple balls and located between the first and second matching portions. When the second connector is driven, the first connector is activated via the positioning member. The two ends of the resilient member contact the outer tube and the second connector respectively. When the outer tube is rotated to align one of the scales to the index line, the resilient member is adjusted to set the maximum torque to be output. When the object is tightened to a level which is larger than the force of the resilient member, the reaction force of the second connector overcomes the force of the resilient member, the second connector is separated from the positioning member. Therefore, the second connector cannot drive the first connector to achieve the adjustment of the torque. However, there is only one place of the inner tube has the index line and the outer tube has scales on the outer periphery thereof, so that when adjusting the torque, the user has to rotate the inner tube to align the index line to the scales. This is not convenient for operation. Besides, the scales of the outer tube have only one system which cannot be cooperated with the English system or the Metric system. Furthermore, the machining of the scales on the curved surface of the outer tube is difficult.

The present invention intends to provide a torque connector assembly that improves the shortcomings of the conventional torque connector assembly.

SUMMARY OF THE INVENTION

The present invention relates to a torque connector assembly and comprises an outer tube, an inner tube, a first connector, a second connector, a third connector and a resilient member. The outer tube has a first threaded portion, a first hole, a first flange and multiple windows. Each of the windows has first and second scales respectively formed on two sides thereof. The inner tube has a second threaded portion, a second hole, a second flange and an index line. The first and second threaded portions are threadedly connected to each other. The index line is located corresponding to the windows. The first connector has a first engaging end and a second engaging end respectively on two ends thereof. The second connector has a first matching portion and a second mounting portion on tow ends thereof. The second mounting portion is mounted to the second engaging end. The third connector has a second matching portion so as to be connected with the first matching portion. The third connector has a third mounting portion which extends from the second hole. The resilient member is biased between the second connector and the underside of the outer tube.

The primary object of the present invention is to provide a torque connector assembly which allows the user to easily check the torque value. The torque connector assembly is easily manufactured.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
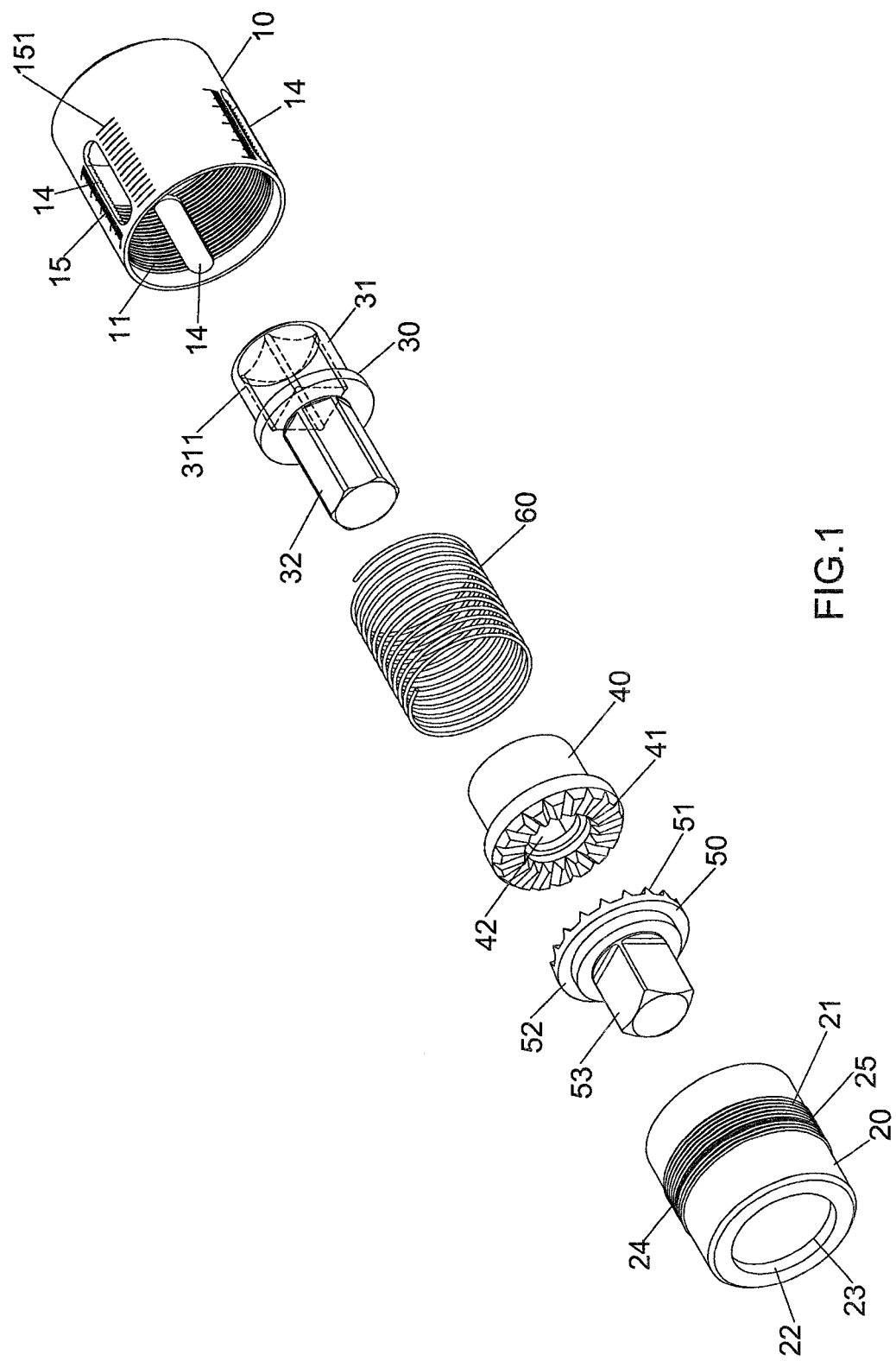
FIG. 1 is an exploded view to show the torque connector assembly of the present invention.
Figure 3:
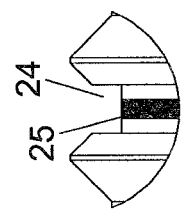
FIG. 3 is an enlarged view of the circled A in FIG. 2.
Figure 2:
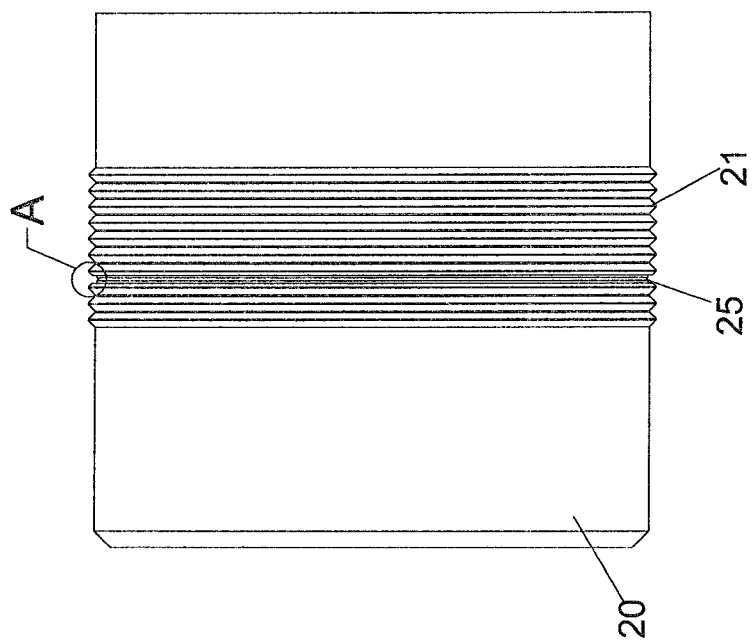
FIG. 2 is a cross sectional view of the inner tube of the torque connector assembly of the present invention.

Referring to FIGS. 1 to 3, the torque connector assembly of the present invention comprises an outer tube 10, an inner tube 20, a first connector 30, a second connector 40, a third connector 50 and a resilient member 60. The outer tube 10 has a first threaded portion 11 defined in the inner periphery of the first end there and a first hole 12 is defined centrally through the second end of the outer tube 10. A first flange 13 extends inward and radially from the second end of the outer tube 10 so as to define the first hole 12. Multiple hollowed windows 14 are defined through the wall of the outer tube 10 and located close at the first threaded portion 11. There are three windows 14 in this embodiment. Each of the windows 14 is an elongate window and first and second scales 15, 151 are respectively formed on two sides of each of the windows 14. The first and second scales 15, 151 represent different measuring systems.

The inner tube 20 has a second threaded portion 21 defined in the outer periphery of the first end thereof and a second hole 22 is defined centrally through the second end of the inner tube 20. The first and second threaded portions 11, 21 are threadedly connected to each other. A second flange 23 extends inward and radially from the second end of the inner tube 20 so as to define the second hole 22. A groove 24 is defined in the outer periphery of the inner tube 20 and located in the second threaded portion 21. The diameter of the groove 24 is smaller than that of the second threaded portion 21. The groove 24 is located corresponding to the windows 14 and an index line 25 is formed at the inner end of the groove 24. The first index line 25 has a bright color for convenience of observation.

The first connector 30 is located in a space 16 between the outer and inner tubes 10, 20. A first engaging end 31 and a second engaging end 32 are respectively on two ends of the first connector 30. The first engaging end 31 extends from the first hole 12 and has a rectangular first mounting portion 311 defined in the center thereof. The first mounting portion 311 is a rectangular recess. The first connector 30 contacts the first flange 13. The second engaging end 32 is a non-circular protrusion and in this embodiment, second engaging end 32 is a hexagonal rod.

The second connector 40 is located in the space 16 and a first matching portion 41 is defined in the first end thereof. A second mounting portion 42 is defined in the second end of the second connector 40 and mounted to the second engaging end 32. In this embodiment, the second mounting portion 42 is a hexagonal recess.

The third connector 50 is located in the space 16 and a second matching portion 51 is defined in the first end thereof. The second matching portion 51 is matched with the first matching portion 41. An annular contact portion 52 is formed on the opposite of the second matching portion 51. A third mounting portion 53 is a rectangular rod extending from the second end of the third connector 50. The third mounting portion 53 extends from the second hole 22 so as to be connected with a socket. The contact portion 52 contacts the second flange 23.

The resilient member 60 is biased between the second connector 40 and an underside of the outer tube 10.

Figure 4:
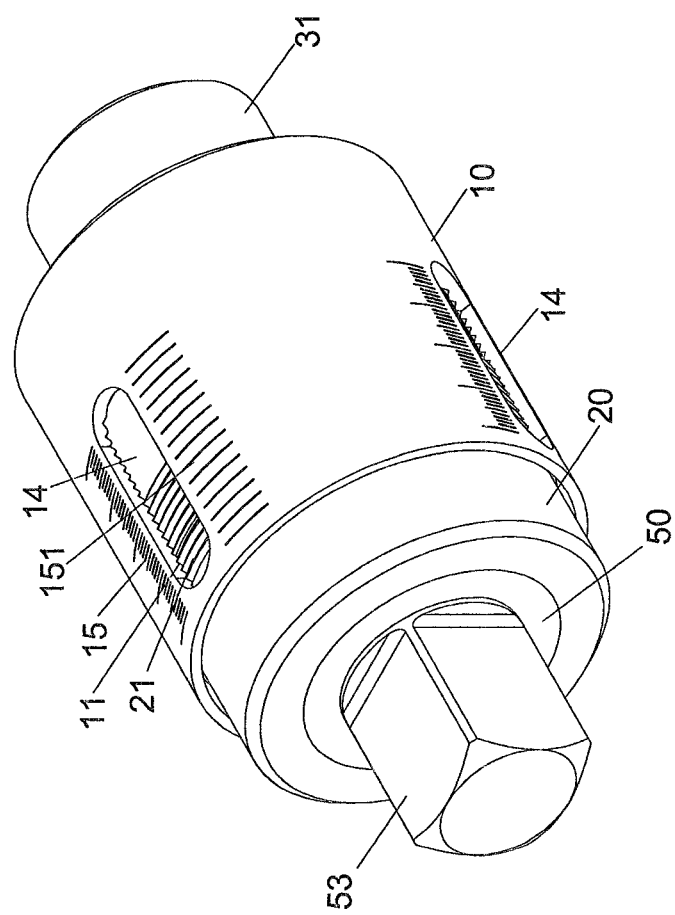
FIG. 4 is a perspective view to show the torque connector assembly of the present invention.

When in use, as shown in FIG. 4, the first and second threaded portions 11, 21 are threadedly connected to each other. The groove 24 is located corresponding to the windows 14. The first engaging end 31 extends through the first hole 12 and contacts the first flange 13. The second mounting portion 42 is mounted to the second engaging end 32. The first matching portion 41 is matched with the second matching portion 51. The third mounting portion 53 extends through the second hole 22 and the contact portion 52 contacts the second flange 23. The resilient member 60 is biased between the second connector 40 and the underside of the outer tube 10.

Figure 5:
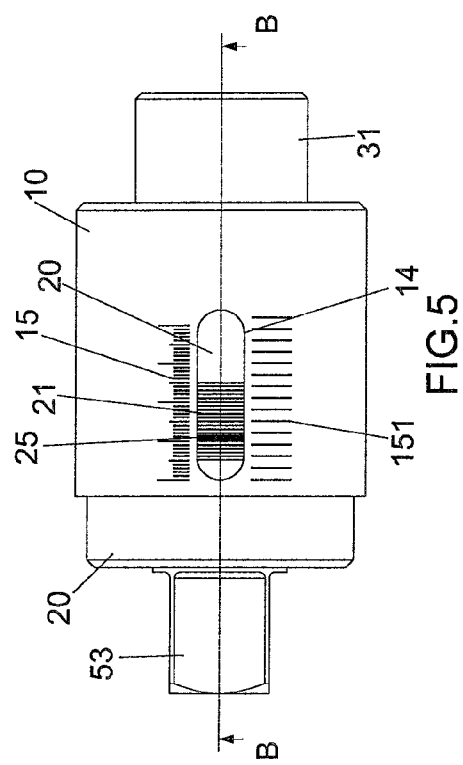
FIG. 5 is a side view to show the torque connector assembly of the present invention.
Figure 6:
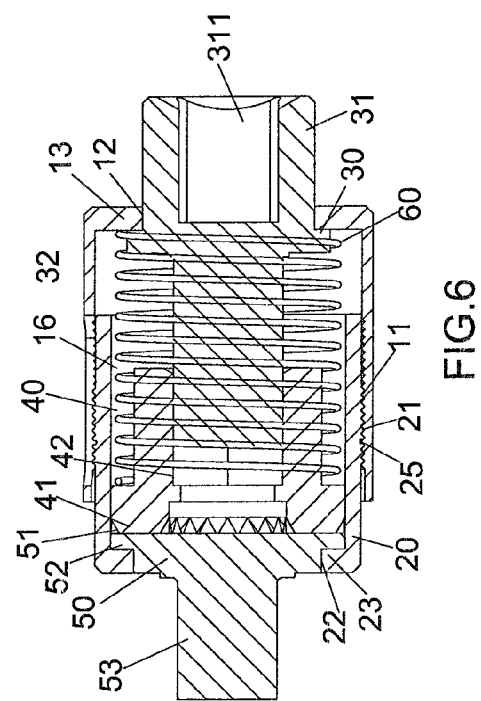
FIG. 6 is a cross sectional view taken along line B-B in FIG. 5.

As shown in FIGS. 5 and 6, the outer and inner tubes 10, 20 are connected to each other, and the index line 25 is in alignment with the first and second scales 15, 151, so that the resilient member 60 is adjusted to set the torque. The wrench connected to the first mounting portion 311 is rotated, the first connector 30 drives the second connector 40 and the third connector 50. The socket on the third mounting portion 53 rotates the object. Because the first and second matching portions 41, 51 are matched with each other, when the object is tighten to a level, the reaction force is generated, the first and second matching portions 41, 51 are separated from each other. The second connector 40 is moved back to compress the resilient member 60, so that the second connector 40 cannot drive the third connector 50.

Figure 7:
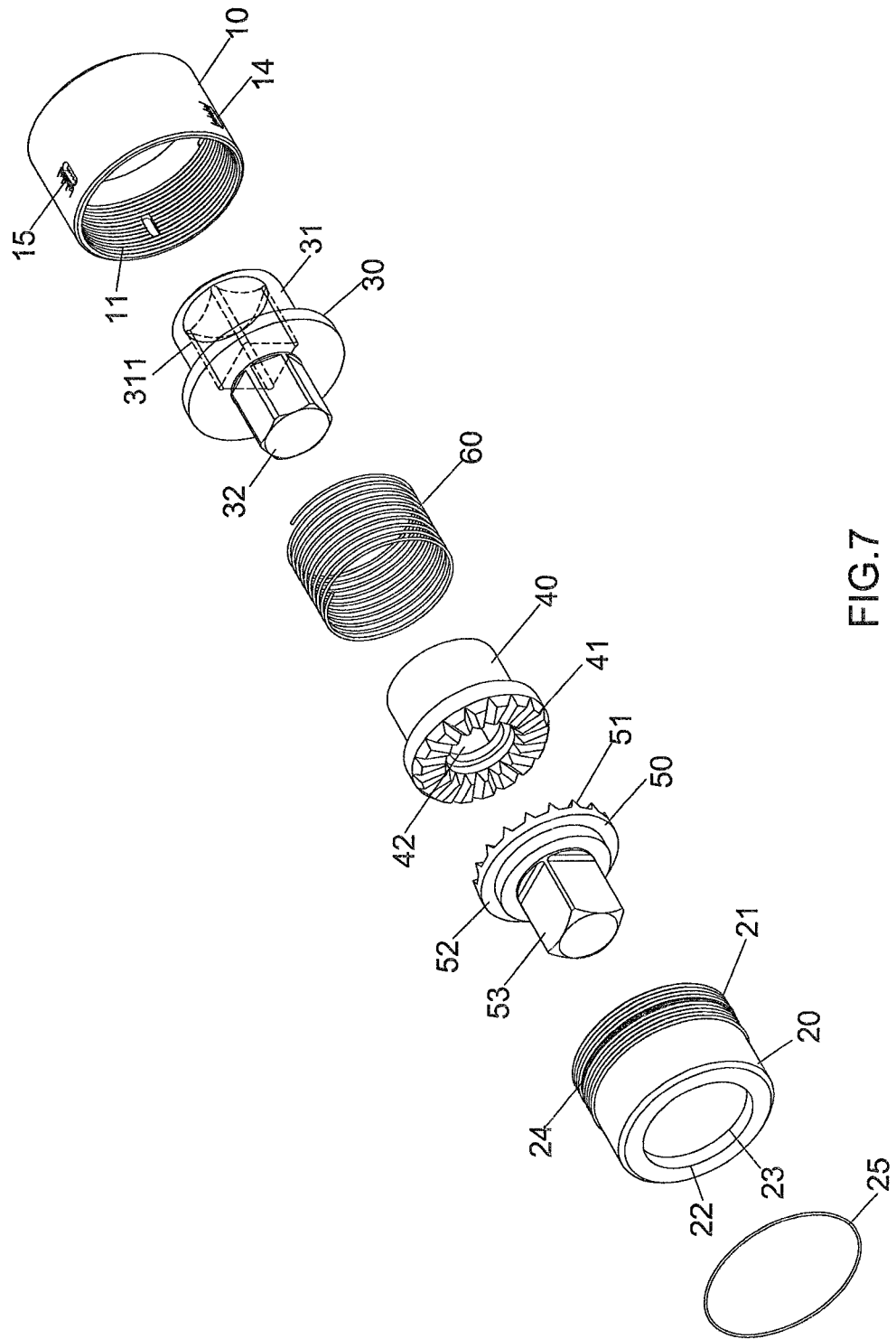
FIG. 7 is an exploded view to show the second embodiment of the torque connector assembly of the present invention.
Figure 8:
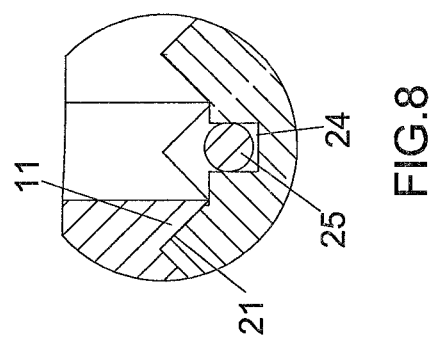
FIG. 8 is an enlarged view of the groove of the second embodiment of the torque connector assembly of the present invention.

As shown in FIGS. 7 and 8, the index line 25 is an individual ring and engaged with the groove 24.

Figure 9:
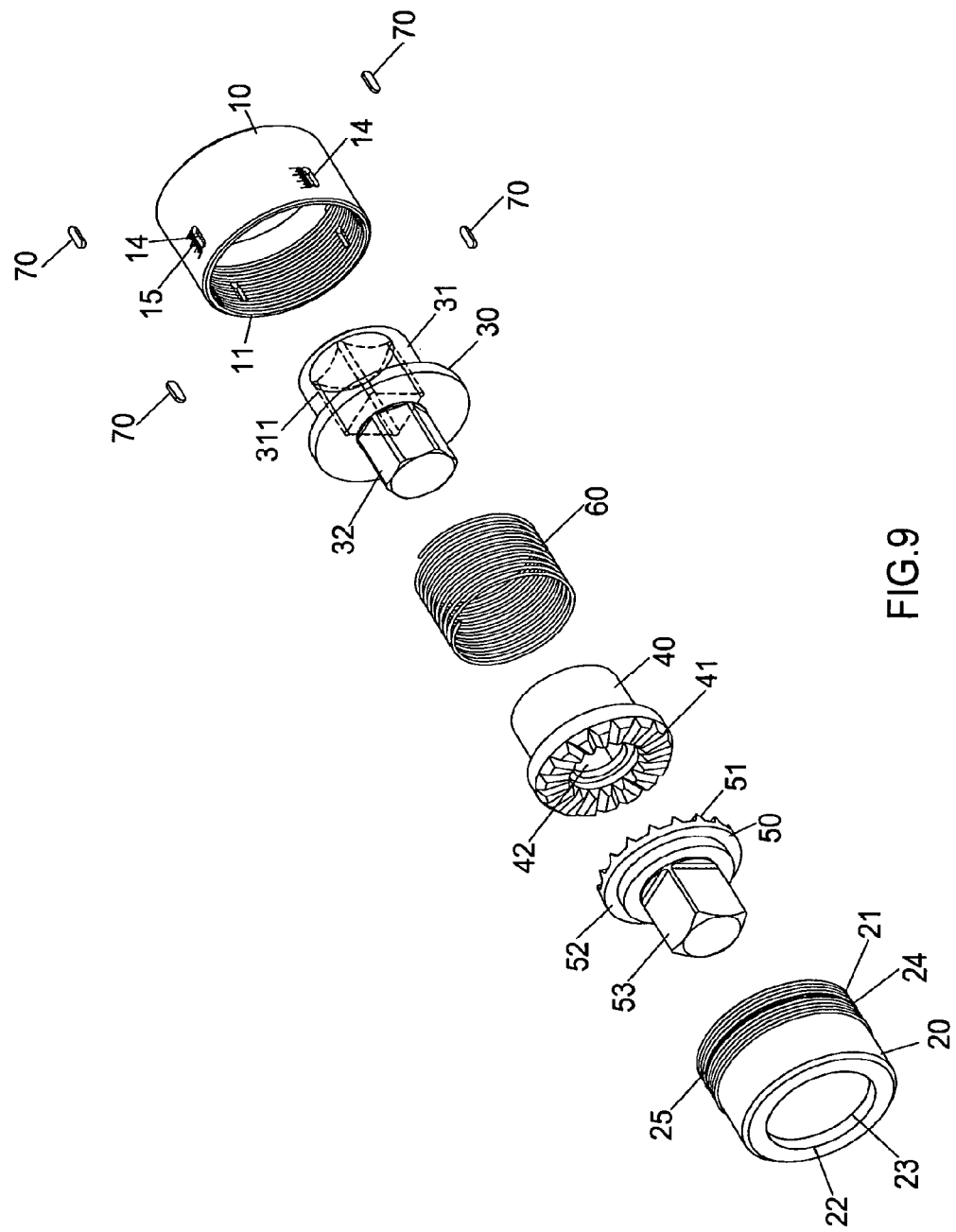
FIG. 9 is an exploded view to show the third embodiment of the torque connector assembly of the present invention.

As shown in FIG. 9, each of the windows 14 has a transparent member 70 mounted thereto so as to protect the groove 24 and the index line in the inner tube 20.

Figure 10:
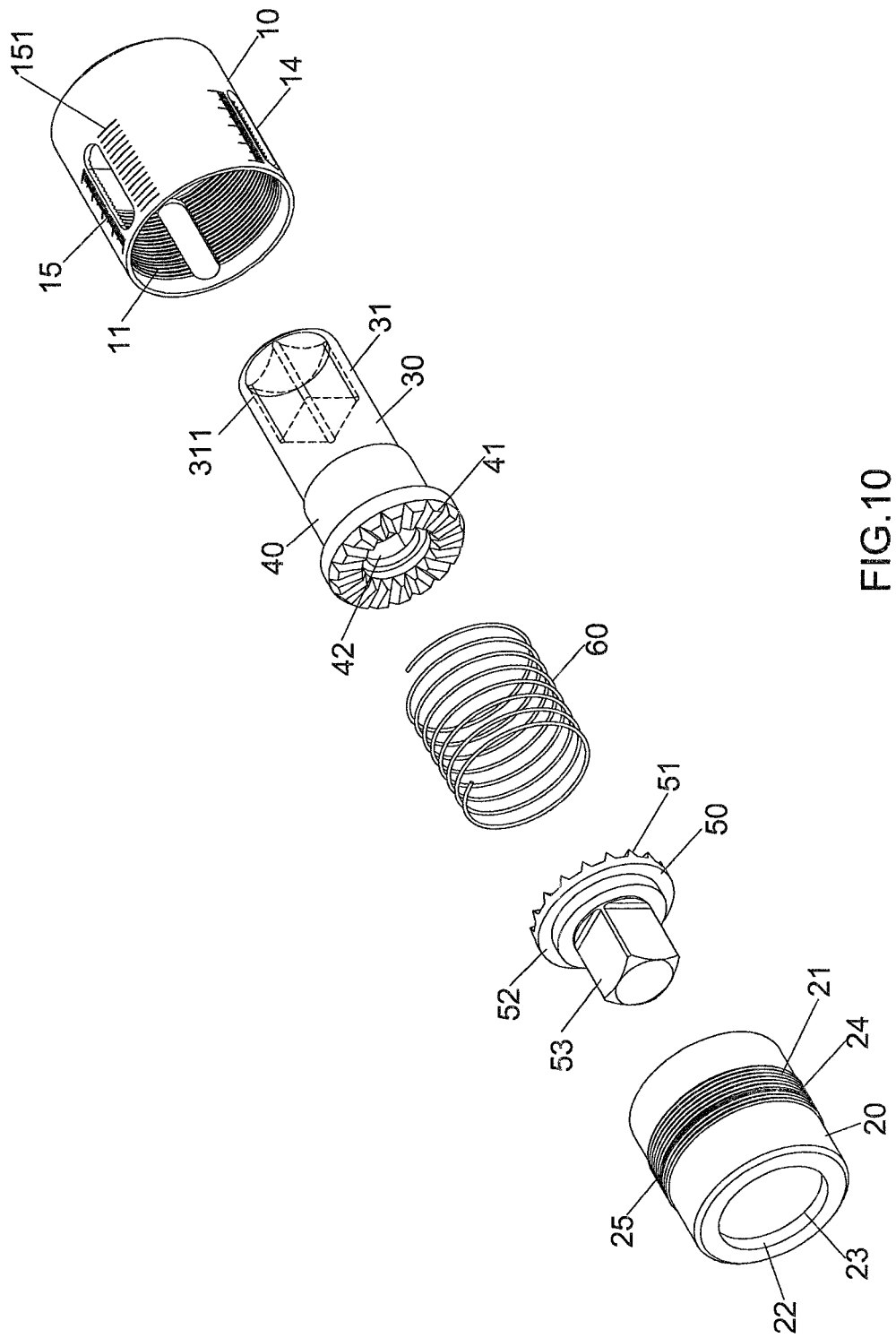
FIG. 10 is an exploded view to show the fourth embodiment of the torque connector assembly of the present invention.
Figure 11:
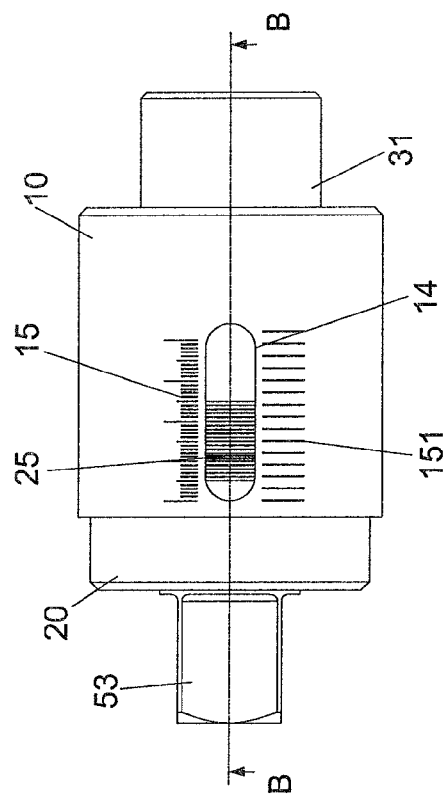
FIG. 11 is a side exploded view of the fourth embodiment of the torque connector assembly of the present invention.
Figure 12:
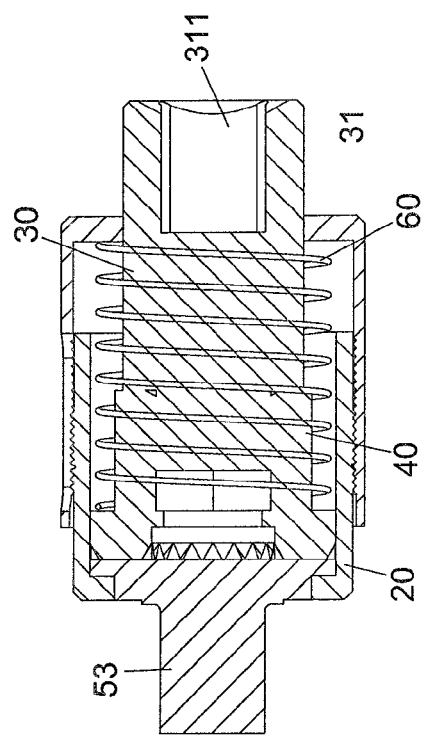
FIG. 12 is a cross sectional view taken along line B-B in FIG. 11.

As shown in FIGS. 10 to 12, the first and second connector 30, 40 are an integral member and the first engaging end 31 and the first matching portion 41 are respectively formed on two ends of the integral member. The first engaging end 31 extends through the first hole 12.

Figure 13:
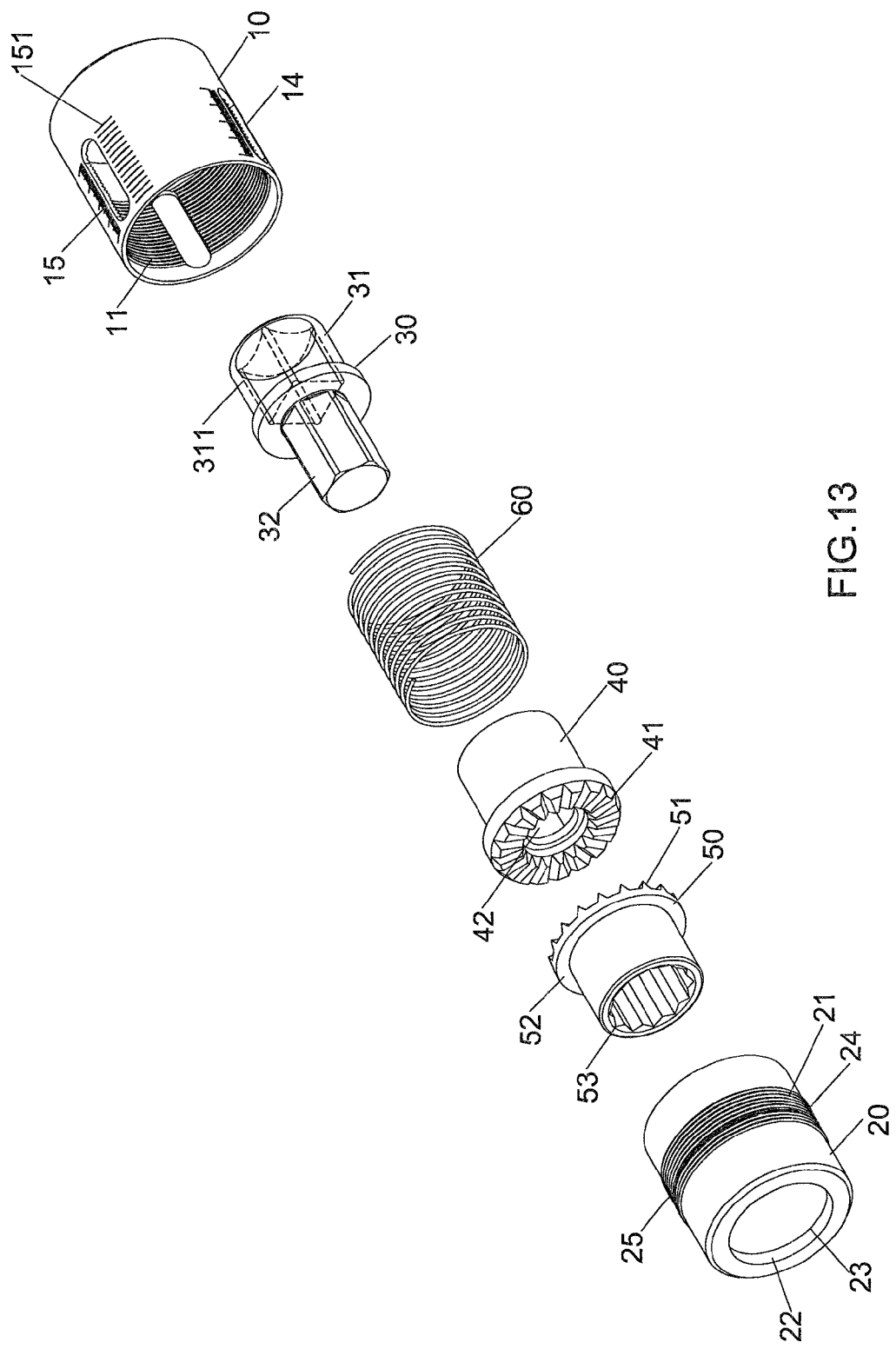
FIG. 13 is an exploded view to show the fifth embodiment of the torque connector assembly of the present invention.

As shown in FIG. 13, the third mounting portion 53 is a hexagonal recess or a bi-hexagonal recess.

Figure 14:
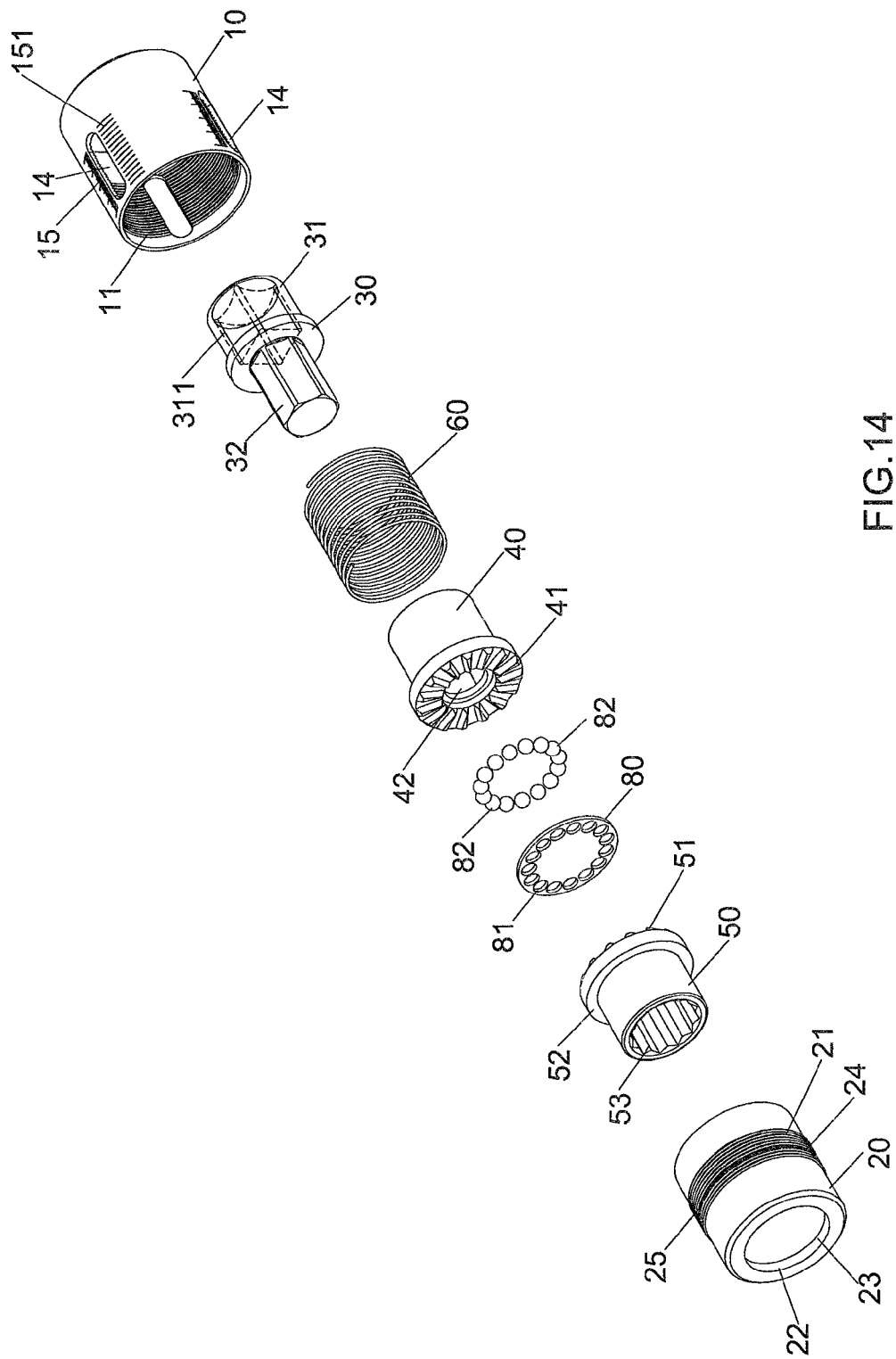
FIG. 14 is an exploded view to show the sixth embodiment of the torque connector assembly of the present invention.

As shown in FIG. 14, a bead plate 80 is located between the first matching portion 41 and the second matching portion 51, the bead plate 80 has multiple apertures 81 and each aperture 81 receives one of the beads 82. The first matching portion 41 rotates the second matching portion 51 by the beads 82. When the torque is higher than the set torque, the beads 82 move over the teeth of the second patching portion 51.

When there are three windows 14, there will be six different scaling systems available.

Each of the windows 14 has first and second scales 15, 151 on two sides thereof so that when rotating the outer tube 10, the torque can easily be observed by the scales.

The first and second scales 15, 151 on two sides of each of the windows 14 are easily printed on the outer periphery of the outer tube 10.

The first and second scales 15, 151 on two sides of each of the windows 14 represent two different scaling systems which are helpful for the users in different countries.

While we have shown and described the embodiment in accordance with the present invention, it should be clear to those skilled in the art that further embodiments may be made without departing from the scope of the present invention.

What is claimed is:

1. A torque connector assembly comprising:

an outer tube having multiple windows defined through a wall thereof, a first threaded portion defined in an inner periphery of a first end of the outer tube and a first hole defined centrally through a second end of the outer tube, a first flange extending inward and radially from the second end of the outer tube so as to define the first hole in a center of the first flange, each of the windows being an elongate window and first and second scales respectively formed on two sides of each of the windows, the first and second scales representing different measuring systems;

an inner tube having a second threaded portion defined in an outer periphery of a first end thereof and a second hole defined centrally through a second end of the inner tube, the first and second threaded portions being threadedly connected to each other, a second flange extending inward and radially from the second end of the inner tube so as to define the second hole in a center of the second flange, a groove defined in the outer periphery of the inner tube and located in the second threaded portion, a diameter of the groove being smaller than that of the second threaded portion, the groove is located corresponding to the windows and an index line being formed at an inner end of the groove;

a first connector located in a space between the outer and inner tubes, a first engaging end and a second engaging end respectively on two ends of the first connector, the first engaging end extending from the first hole and having a rectangular first mounting portion defined in a center thereof, the first connector contacting the first flange, the second engaging end being a hexagonal rod;

a second connector located in the space and a first matching portion defined in a first end thereof, a second mounting portion defined in a second end of the second connector and mounted to the second engaging end;

a third connector located in the space and a second matching portion defined in a first end thereof, the second matching portion being matched with the first matching portion, an annular contact portion formed on an opposite of the second matching portion, a third mounting portion being a rectangular rod extending from the a second end of the third connector, the third mounting portion extending from the second hole, the contact portion contacting the second flange, and a resilient member biased between the second connector and an underside of the outer tube.

2. The assembly as claimed in claim 1, wherein the index line is an individual ring and engaged with the groove.

3. The assembly as claimed in claim 1, wherein each of the windows has a transparent member mounted thereto.

4. The assembly as claimed in claim 1, wherein there are three windows.

5. The assembly as claimed in claim 1, wherein multiple beads are located between the first matching portion and the second matching portion.

6. The assembly as claimed in claim 5, wherein a bead plate is located between the first matching portion and the matching mounting portion, the bead plate has multiple apertures and each aperture receives one of the beads.

* * * * *